United States Patent
Culliss

Patent Number: 6,006,222
Date of Patent: Dec. 21, 1999

[54] METHOD FOR ORGANIZING INFORMATION

[76] Inventor: Gary Culliss, 9737 Larsen St., Overland Park, Kans. 66214

[21] Appl. No.: 08/904,795

[22] Filed: Aug. 1, 1997

Related U.S. Application Data

[63] Continuation-in-part of application No. 08/840,922, Apr. 25, 1997.

[51] Int. Cl.⁶ ..................................................... G06F 17/30

[52] U.S. Cl. .................................. 707/5; 707/10

[58] Field of Search ................. 707/5, 3, 10, 2, 707/1

[56] References Cited

U.S. PATENT DOCUMENTS

| | | | |
|---|---|---|---|
| 5,321,833 | 6/1994 | Chang et al. | 707/5 |
| 5,535,382 | 7/1996 | Ogawa | 707/5 |
| 5,754,939 | 5/1998 | Herz et al. | 455/4.2 |

OTHER PUBLICATIONS

Savoy, "A New Probabilistic Scheme for Information Retrieval in Hypertext", New Review of Hypermedia and Multimedia, Applications and Research, vol. 1, pp. 107–34, 1995.

Fuhr et. al. Probabilistic Learning Approaches for indexing and retrieval with the TREC–2 Collection, TREC Text REtrieval Conference, pp. 67–74, 1993.

*Primary Examiner*—Jack M. Choules
*Attorney, Agent, or Firm*—Gary Culliss

[57] ABSTRACT

A method of organizing information in which the search activity of a user is monitored and such activity is used to organize articles in a subsequent search by the same or another user who enters a similar search query. The invention operates by assigning scores to articles under the key terms in the index. As users enter search queries and select articles, the scores are altered. The scores are then used in subsequent searches to organize the articles that match a search query. As millions of people use the Internet, type in millions of search queries, and display or select from the many articles available over the Internet, the ranks the information available over the Internet through an evolutionary process. The invention includes additional embodiments which incorporate category key terms and rating key terms.

46 Claims, 1 Drawing Sheet

METHOD FOR ORGANIZING INFORMATION

RELATED APPLICATION

This patent application is a continuation-in-part of co-pending patent application, Ser. No. 08/840,922, filed Apr. 25, 1997, also entitled "Method for Organizing Information."

BACKGROUND OF THE INVENTION

1. Related Disclosures

This patent application contains subject matter disclosed in Disclosure Document Numbers 411,887; 417,369 and 417,458.

2. Field of the Invention

The present invention relates to search engines, and more particularly pertains to a method for organizing information by monitoring the search activity of users.

3. Description of the Prior Art

The Internet is an extensive network of computer systems which allows a user to connect with various computer servers or systems. The Internet permits users to send and receive data between computers connected to this network. This data may include web sites, home pages, databases, text collections, audio, video or any other type of information made available over the Internet (collectively referred to as "articles") from a computer server connected to the Internet. The articles may also include key terms representing selected portions of the information contained in the article. These key terms are available over the Internet to other computers and permit these other computers to locate the article.

To locate articles on the Internet, a user of a remote computer searches for the key terms using a search program known as a search engine. Examples of search engines currently available on the Internet include "Yahoo!" (TM), "Excite" (TM), and "Alta Vista" (TM). These programs allow the remote user to type in one or more search terms, typically as a combination of English words. The search terms may be connected by Boolean logic operators or may be truncated and combined with wild card terms to form a search query. The search engine then compares the search query with the key terms from the articles and retrieves at least a portion of the articles having key terms which match the search query. The search engine will then display to the user the portion of the article such as the title. The user can then scroll through these retrieved portions of the articles and select a desired article.

Conventional key word searching and various prior art methods of accomplishing such key word searching are disclosed in at least the following patents:

| U.S. Pat. No. | Title |
| --- | --- |
| 5,588,060 | METHOD AND APPARATUS FOR A KEY-MANAGEMENT SCHEME FOR INTERNET PROTOCOLS; |
| 5,546,390 | METHOD AND APPARATUS FOR RADIX DECISION PACKET PROCESSING; |
| 5,528,757 | ROUTING SYSTEM FOR RETRIEVING REQUESTED PROGRAM BY DISCARDING RECEIVED PROGRAM IDENTICAL WITH STORED PROGRAMS AND TRANSFERRING THE RECEIVED PROGRAM NOT IDENTICAL WITH STORED PROGRAMS; |
| 5,377,355 | METHOD AND APPARATUS FOR AUTOMATED PROCEDURE INITIATION IN A DATA PROCESSING SYSTEM INCLUDING SOLICITING AN EVALUATION VOTE FROM USERS AUTOMATICALLY DETERMINED IN RESPONSE TO IDENTIFICATION OF A FUNCTIONAL AREA ASSOCIATED WITH A DOCUMENT; |
| 5,404,507 | APPARATUS AND METHOD FOR FINDING RECORDS IN A DATABASE BY FORMULATING A QUERY USING EQUIVALENT TERMS WHICH CORRESPOND TO TERMS IN THE INPUT QUERY; |
| 5,408,586 | HISTORICAL DATABASE TRAINING METHOD FOR NEURAL NETWORKS; |
| 5,408,655 | USER INTERFACE SYSTEM AND METHOD FOR TRAVERSING A DATABASE; |
| 5,371,676 | APPARATUS AND METHOD FOR DETERMINING DATA OF COMPOUND WORDS; |
| 5,185,888 | METHOD AND APPARATUS FOR DATA MERGING/SORTING AND SEARCHING USING A PLURALITY OF BIT-SLICED PROCESSING UNITS; |
| 4,967,341 | METHOD AND APPARATUS FOR PROCESSING DATA BASE; |

A person who places an article on the Internet typically intends for it to be available to all people who type in search terms that are even remotely related to the subject matter of the article. This increases the exposure of the article to the public searching the Internet. Such increased exposure can potentially increase product sales or advertising revenue for the owner of the article, especially if advertising revenue is related to the number of visits to the article or web site. Thus, there is an incentive to use as many search terms as are possibly related to the article. In fact, some articles or search engines use every word in the article as key terms. As a result, search engines will retrieve many articles which are unrelated to the subject matter which the user desires to find through a combination of search terms.

Further, some Internet users are not skilled in selecting and connecting key word search queries. These users will often type in a single word or two words connected by an "AND" operator. These searches are extremely broad and often retrieve thousands of articles which the user must manually search through by examining the title or other brief information about each article to find the desired information or advertisement.

As the total number of articles posted on the Internet continues to increase, there is an increasing number of articles retrieved with each search query. To find an article, the user must manually search through the retrieved articles and/or repeatedly modify the search query.

OBJECTS AND SUMMARY OF THE INVENTION

Accordingly, it is an object of the invention to organize articles available on the Internet.

It is another object of the present invention to monitor searching activity to organize articles in accordance with the searching activity of one or more users.

To accomplish these and other objects, the present invention generally comprises a method of organizing information in which the search activity of a user is monitored and such activity is used to organize articles displayed in the search results. The invention operates by assigning scores to key terms and categories for articles. As users enter search queries and select articles, the scores are altered. The scores are then used in subsequent searches to organize the articles that match a search query. The method allows the search activity of a large number of Internet users to organize the information available over the Internet through an evolutionary process.

This brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the method set forth in the following description. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other methods and systems for carrying out the objects and purposes of the present invention. It is important, therefore, that the claims be regarded as including such equivalent constructions insofar as they do not depart from the spirit and scope of the present invention.

DESCRIPTION OF THE PREFERRED EMBODIMENTS

Figure 1:
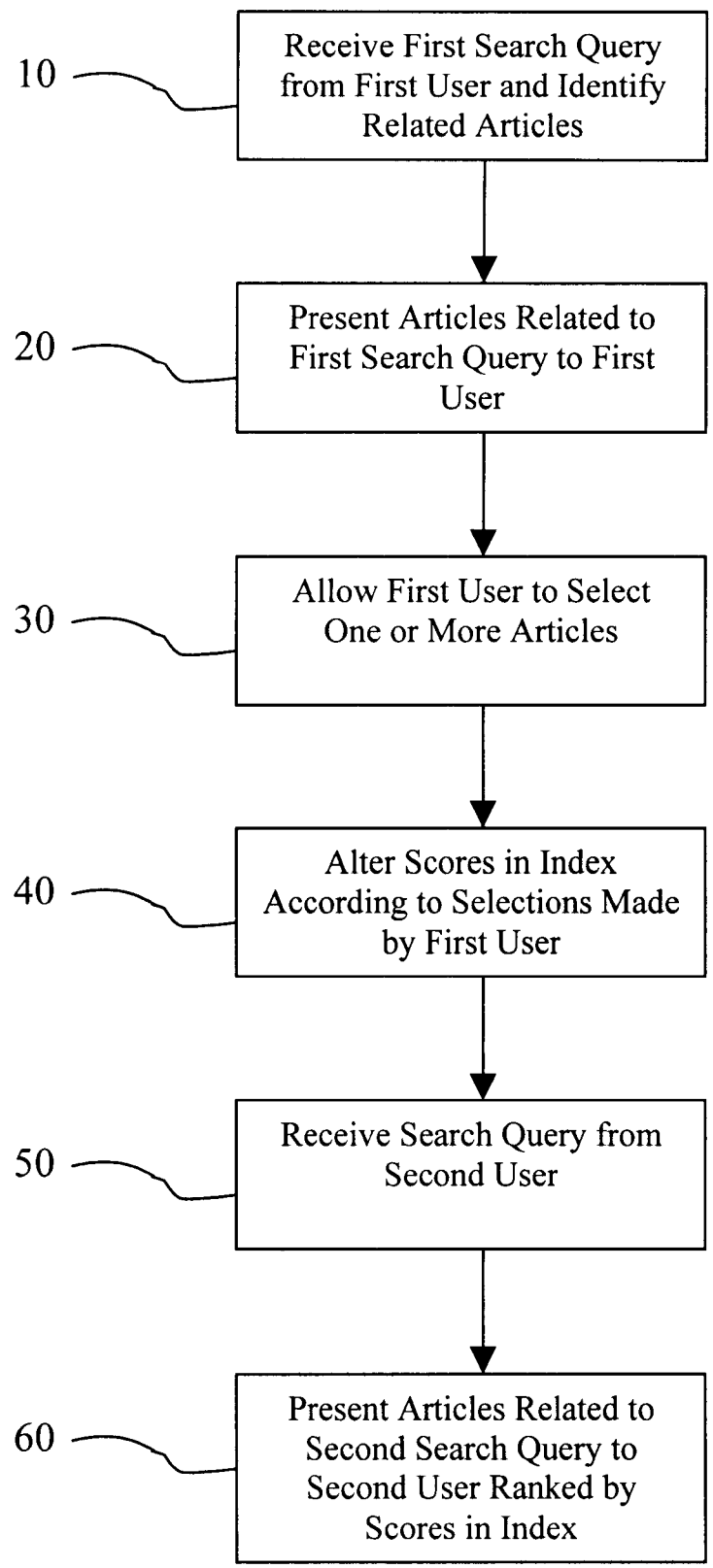
FIG. 1 illustrates in flow diagram form the operational steps taken by the system.

The Internet is an extensive network of computer systems which allows a user to connect with various computer servers or systems. The Internet permits users to send and receive data between the computers connected to this network. The data can be read, viewed or listened to on a browser or other software program from over the Internet on a remote user's computer. This data may comprise articles, databases, data collections, web sites, web pages, graphics, encryption, audio, video or any other type of information collectively referred to as articles and designated herein by the generic labels A1, A2, A3, etc.

The present invention maintains an index of key words, terms, data or identifiers in English or other languages, computer code, or encryption which are collectively referred to as key terms and represented herein by the generic labels Alpha, Beta, Gamma, Delta, Epsilon, etc.

The articles are each associated with one or more of these key terms by any conceivable method of association, such as through indexing all words or through meta-tag headers containing key words selected by the author or editor. Further, a key term score is associated with each article for each of the key terms. For example, an initial index setting may look like this:

| Index | | | | |
|---|---|---|---|---|
| Alpha | Beta | Gamma | Delta | Epsilon |
| A1 - 1 | A1 - 1 | A1 - 1 | A2 - 1 | A1 - 1 |
| A2 - 1 | | A3 - 1 | A3 - 1 | A3 - 1 |
| A3 - 1 | | | | |

The invention will accept a search query from a user and a search engine will identify key terms which match the search query. These key terms which match the search query are called matched key terms. The search engine then identifies in any conceivable manner the articles which are associated with the matched key terms. This can be done by comparing all or part of the search query, or terms equivalent to those in the search query with the key terms in the index to identify the key terms which match the search query. The search engine may account for Boolean logic operators in the search query.

In the example above, and as illustrted at 10 in FIG. 1, a search query of "Alpha AND Gamma" would identify articles A1 and A3 because they are both associated with the matched key terms Alpha and Gamma. Because articles A1 and A3 are associated with the matched key terms, these articles are called matched articles.

As shown in FIG. 1 at 20, the search engine will then display a squib of each of the matched articles. The squib may comprise any portion, hypertext link to or representation of the matched article, such as the title, headings, first few lines of text, audio, video or any other type of information. As shown in FIG. 1 at 30, the user can then scroll through the squibs of the articles and select a desired one of the matched articles by opening, retrieving, reading, viewing, listening to or otherwise closely inspecting the article from over the Internet or from any other storage area. The matched article selected by the user is called the selected matched article.

Once the user has selected a matched article, and as shown in FIG. 1 at 40, the index can be altered such that the key term scores for the selected matched article under the matched key terms are altered relative to other key term scores. This indicates that the user believes that the matched key terms for that selected matched article are properly associated with the selected matched article. To alter the key term scores, a positive score such as (+1) can be added to the key term scores, for example, although any other possible indication can be used and the key term scores can be altered by any possible type of operation, mathematical or otherwise, to alter the key term scores for the selected matched article under the matched key terms relative to other key term scores.

Thus, after executing the search query "Alpha AND Gamma," the search engine would display the squib of matched articles A1 and A3. If the user selected only article A3, the index could be altered such that the key term scores for the selected matched article A3 under the matched key terms Alpha and Gamma are altered relative to the other key term scores. The index would then look like this:

| Index | | | | |
|---|---|---|---|---|
| Alpha | Beta | Gamma | Delta | Epsilon |
| A1 - 1 | A1 - 1 | A1 - 1 | A2 - 1 | A1 - 1 |
| A2 - 1 | | A3 - 2 | A3 - 1 | A3 - 1 |
| A3 - 2 | | | | |

For the next search by either the same or a different user, the invention could then rank the matched articles by using the key term scores, as shown in FIG. 1 at 50 and 60. To this end, the key term scores of each matched article under each of the matched key terms of the new search could then be associated in any possible manner to create a comparison score for each matched article. For example, the key term scores could be added, multiplied together or averaged to create the comparison score for that matched article. The matched articles can then be displayed to the user in order of comparison score superiority, such as by displaying the matched article with the highest comparison score first.

For example, the search query "Alpha AND Epsilon" would again identify matched articles A1 and A3. By multiplying the key term scores of each matched article under each matched key term together to get the comparison score, the comparison score for article A1 would equal 1, whereas the comparison score for article A3 would be 2. The invention would then display the matched article A3 to the user in a superior position to matched article A1.

DISPARATE SEARCH ACTIVITY

To compensate for disparate search activity for certain articles relative to other articles, the invention may include a key term total score for each key term score of each article under each key term. After each search query is entered or after any other event occurs, the index could then be altered such that the key term total score of each matched article under each matched key term is altered relative to other key term total scores. The index could be altered in this manner after each search query is entered or after any other event, such as after the user has selected one or more articles or has read a matched article for a predetermined length of time.

For example, the index could have an initial setting such as is shown here where the key term scores are separated from the key term total scores by a backslash (/) and given an initial value of one.

| | | Index | | |
|---|---|---|---|---|
| Alpha | Beta | Gamma | Delta | Epsilon |
| A1 - 1/1 | A1 - 1/1 | A1 - 1/1 | A2 - 1/1 | A1 - 1/1 |
| A2 - 1/1 | | A3 - 1/1 | A3 - 1/1 | A3 - 1/1 |
| A3 - 1/1 | | | | |

As illustrated above, if the user selected only article A3 after executing the search query "Alpha AND Gamma," the key term score for article A3 under the matched key terms Alpha and Gamma would be altered relative to other key term scores. Further, the key term total scores for both article A1 and article A3 under the matched key terms could also be altered. If the positive score is added to the key term scores for the selected matched article A3 under the matched key terms Alpha and Gamma, and the positive score is added to the key term total scores for the matched articles A1 and A3 (regardless of whether they were selected or not) under the matched key terms, the index would then look like this:

| | | Index | | |
|---|---|---|---|---|
| Alpha | Beta | Gamma | Delta | Epsilon |
| A1 - 1/2 | A1 - 1/1 | A1 - 1/2 | A2 - 1/1 | A1 - 1/1 |
| A2 - 1/1 | | A3 - 2/2 | A3 - 1/1 | A3 - 1/1 |
| A3 - 2/2 | | | | |

For the next search, the invention could then organize or rank the articles by first comparing the key term scores as related to the respective key term total scores for each of the matched articles under each matched key term to create a key term probability score for that matched article under each respective matched key term from the new search. To this end, the key term scores of each matched article under each of the matched key terms could be compared or associated with their respective key term total score in any known manner to create the key term probability scores for that matched article under the respective matched key terms. For example, the key term scores of each matched article under the matched key terms could be divided by their respective key term total score to create the key term probability score of that matched article under that matched key term.

The key term probability scores of each matched article under each of the matched key terms could then be associated in any known manner to create the comparison score for each matched article identified in the search. For example, the key term probability scores could be added, multiplied or averaged together to create the comparison score for that matched article. The articles can then be displayed to the user in order of superiority, such as by displaying the article with the highest comparison score first.

For example, the new and different search query "Alpha AND Epsilon" would again identify matched articles A1 and A3. The key term probability score for matched article A1 under the key term Alpha would equal the key term score of 1 divided by the key term total score of 2, for a key term probability score of 0.5. Similarly, the key term probability score for matched article A2 under the key term Alpha would equal the key term score of 2 divided by the key term total score of 2, for a key term probability score of 1. Under the key term Epsilon, the key term probability score for matched article A1 would be 1, and the key term probability score for matched article A3 would also be 1, as neither of these scores has been altered from the initial setting in this example.

By multiplying the key term probability scores of each matched article under each matched key term together to get the comparison score, for example, the comparison score for article A1 would equal 0.5, whereas the comparison score for article A3 would be 1. The invention could then display the article A3 to the user in a superior position to article A1 because the comparison score for matched article A3 is higher.

Increased Resolution:

To provide for increased resolution in search ranking, the index may include matching associations of two or more key terms. For example, in the index illustrated below, each key term is grouped with one or more other key terms in a matrix format. Single key terms can be represented by a grouping of identical terms. Using the same initial settings from above, articles are listed in the boxes formed at the intersection of the rows and columns of the matrix to indicate that such articles are associated with the intersecting key terms. Although the index is shown in pair groupings, the index can be extended to include triplicate or other associations as well, i.e. separate boxes for Alpha-Beta-Gamma combinations, etc.

The index shown below has empty boxes because some intersecting groupings are substantially equivalent to other intersecting groupings. As such, one of these intersecting groupings, i.e. Alpha-Beta or Beta-Alpha, can be left blank. Alternatively, the equivalent groupings could be used to record and distinguish between the order of key terms in a search query. In other words, a search query of "Alpha AND Beta" could include the grouping Alpha-Beta, whereas the search query "Beta AND Alpha" would include the grouping Beta-Alpha. In such case, the empty boxes in the matrix would be used.

In the example above, article A1 is the only article which is associated with both the key terms Alpha and Beta. Accordingly, article A1 can be listed in at least the Alpha-Alpha box, in the Alpha-Beta box, and in the Beta-Beta box, for example. Doing this for all key term groupings of the articles in the example above would give an initial index that looked like this:

| Index | | | | | |
|---|---|---|---|---|---|
| | Alpha | Beta | Gamma | Delta | Epsilon |
| Alpha | A1 - 1/1<br>A2 - 1/1<br>A3 - 1/1 | A1 - 1/1 | A1 - 1/1<br>A3 - 1/1 | A2 - 1/1<br>A3 - 1/1 | A1 - 1/1<br>A3 - 1/1 |
| Beta | | A1 - 1/1 | A1 - 1/1 | | A1 - 1/1 |
| Gamma | | | A1 - 1/1<br>A3 - 1/1 | A3 - 1/1 | A1 - 1/1<br>A3 - 1/1 |
| Delta | | | | A2 - 1/1<br>A3 - 1/1 | A3 - 1/1 |
| Epsilon | | | | | A1 - 1/1<br>A3 - 1/1 |

During a search, an entered search query would typically include one or more key terms. The search engine could separate these key terms into one or more groupings. For example, the search query "Alpha AND Beta" could have only the one grouping Alpha-Beta, or could be separated into three groupings: Alpha-Alpha, Beta-Beta, and Alpha-Beta.

For larger queries, the search query "Alpha AND Beta AND Gamma" could have three groupings: Alpha-Beta, Beta-Gamma, and Alpha-Gamma, but could additionally include the single groupings Alpha-Alpha, Beta-Beta, and Gamma-Gamma. As an additional example, a more complex query such as "Alpha AND (Beta OR Gamma)" could have the groupings Alpha-Beta and Alpha-Gamma, and could additionally include the single groupings Alpha-Alpha, Beta-Beta, and Gamma-Gamma.

As described above, the invention will then accept a search query from a user and a search engine will identify articles which are indexed with the key terms that match the search query. A search query of "Alpha AND Gamma" would identify matched articles A1 and A3 because they are both indexed with the key term groupings Alpha-Alpha, Gamma-Gamma, and Alpha-Gamma. The key term groupings which match the search query are called matched key term groupings. The search engine will then display a squib of each of the matched articles. The user can then scroll through the squibs of the articles and select a desired one of the matched articles.

Once the user has selected a matched article, the key term scores for the selected matched article under the matched key term groupings can be altered to indicate that the user believes that those matched key term groupings are properly associated with the selected matched article. To alter the key term scores, for example, the positive score can be added to the key term scores, although any other possible type of indication can be used.

If the user selected only article A3, the key term scores for selected matched article A3 under the matched key term groupings Alpha-Gamma would be altered. Additionally, the key term scores for selected matched article A3 under the matched key term groupings Alpha-Alpha and Gamma-Gamma could also be altered since the key terms Alpha and Gamma are each represented individually in the results of the search query.

If the key term total score is also used for each key term score of each article and is altered every time a search query matches that key term grouping of that matched article, the index would then look like this:

| Index | | | | | |
|---|---|---|---|---|---|
| | Alpha | Beta | Gamma | Delta | Epsilon |
| Alpha | A1 - 1/2<br>A2 - 1/1<br>A3 - 2/2 | A1 - 1/1 | A1 - 1/2<br>A3 - 2/2 | A2 - 1/1<br>A3 - 1/1 | A1 - 1/1<br>A3 - 1/1 |
| Beta | | A1 - 1/1 | A1 - 1/1 | | A1 - 1/1 |
| Gamma | | | A1 - 1/2<br>A3 - 2/2 | A3 - 1/1 | A1 - 1/1<br>A3 - 1/1 |
| Delta | | | | A2 - 1/1<br>A3 - 1/1 | A3 - 1/1 |
| Epsilon | | | | | A1 - 1/1<br>A3 - 1/1 |

As explained above, the invention could then organize the articles by first comparing the key term scores as related to the key term total scores for each of the matched articles under each matched key term grouping. To this end, the key term scores of each matched article under each of the matched key term groupings could then be compared or associated with the respective key term total score in any known manner to create the key term probability score for that matched article under each matched key term grouping. For example, the key term scores of each matched article under the matched key term groupings could be divided by the respective key term total score to create the key term probability score for that matched article under those respective key term groupings.

The key term probability scores of each matched article under each of the matched key term groupings could then be associated in any known manner to create the comparison score for each matched article. For example, the key term probability scores could be multiplied together to create the comparison score for that matched article for the search query. The matched articles can then be displayed to the user in order of superiority, such as by displaying the matched article with the highest comparison score first.

For example, a new user entering the search query "Alpha AND Gamma" would result in the search engine again identifying matched articles A1 and A3. Under the key term grouping Alpha-Alpha, the key term probability score for matched article A1 would equal the key term score of 1 divided by the key term total score of 2, for a key term probability score of 0.5. Also, the key term probability score for selected matched article A2 under the key term grouping Alpha-Alpha would equal the key term score of 2 divided by the key term total score of 2, for a key term probability score of 1.

Similarly, under the key term grouping Gamma-Gamma, the key term probability score for matched article A1 would be 0.5, and the key term probability score for selected matched article A3 would equal 1. Under the key term grouping Alpha-Gamma, the key term probability score for the matched article A1 would equal 0.5, and the key term probability score for selected matched article A3 would equal 1.

By multiplying the key term probability scores for each key term of each matched article together to get the comparison score, for example, the comparison score for article A1 would equal 0.5 times 0.5 times 0.5, for a total of 0.125. The comparison score for article A3, on the other hand, would equal 1 times 1 times 1, for a total of 1. The invention could then display the article A3 to the user in a superior position to article A1 because the comparison score for matched article A3 is higher.

CATEGORIES

The invention can also be used to organize articles by category. To this end, the key terms of the index may simply comprise category key terms represented by the generic labels CAT1, CAT2, CAT3, CAT4, etc. The articles can each be associated with one or more of these category key terms, and the key term score is associated with each article for each of the category key terms. Additionally, the index may also include the key term total score for each category key term score of each article, as described above for the key terms.

For example, an initial index setting may look like this:

| | | Index | | |
|---|---|---|---|---|
| CAT1 | CAT2 | CAT3 | CAT4 | CAT5 |
| A1 - 1/1 | A2 - 1/1 | A1 - 1/1 | A2 - 1/1 | A1 - 1/1 |
| A2 - 1/1 | | A3 - 1/1 | A3 - 1/1 | A3 - 1/1 |
| A3 - 1/1 | | | | |

This embodiment of the invention, operating separately from or in addition to the embodiments described above, would permit the user to enter or select a category key term for inclusion in the search query. In this embodiment, the invention would operate in a similar manner for the category key terms as described above for the key terms alone. The invention may allow a user to enter one or more category key terms in formulating a search. For example, the user may enter the category key terms "Apartments" and "Los Angeles" or the category key terms "Romantic" and "Comedy" to find articles (i.e. advertisements or movies) which fall under two or more category key terms.

Moreover, the category key terms can be incorporated into the index of key terms as just another key term and included in the association of the comparison score and, if used, the key term probability scores. The category key terms can have a similar weight as other key terms or may be increasingly or decreasingly weighted to represent relative importance of the categories to the search query. An example of such an index wherein all articles are initially equally ranked in all categories and under all key terms is shown below.

| | Index | | | | | | | |
|---|---|---|---|---|---|---|---|---|
| | Alpha | Beta | Gamma | Delta | Epsilon | CAT1 | CAT2 | CAT3 |
| Alpha | A1-1/1 A2-1/1 A3-1/1 | A1-1/1 | A1-1/1 A3-1/1 | A2-1/1 A3-1/1 | A1-1/1 A3-1/1 | A1-1/1 A2-1/1 A3-1/1 | A1-1/1 A2-1/1 A3-1/1 | A1-1/1 A2-1/1 A3-1/1 |
| Beta | | | A1-1/1 | | A1-1/1 | A1-1/1 | A1-1/1 | A1-1/1 |
| Gamma | | | A1-1/1 A3-1/1 | A3-1/1 | A1-1/1 A3-1/1 | A1-1/1 A3-1/1 | A1-1/1 A3-1/1 | A1-1/1 A3-1/1 |
| Delta | | | | A2-1/1 A3-1/1 | A3-1/1 | A2-1/1 A3-1/1 | A2-1/1 A3-1/1 | A2-1/1 A3-1/1 |
| Epsilon | | | | | A1-1/1 A3-1/1 | A1-1/1 A3-1/1 | A1-1/1 A3-1/1 | A1-1/1 A3-1/1 |
| CAT1 | | | | | | A1-1/1 A2-1/1 A3-1/1 | A1-1/1 A2-1/1 A3-1/1 | A1-1/1 A2-1/1 A3-1/1 |
| CAT2 | | | | | | | A1-1/1 A2-1/1 A3-1/1 | A1-1/1 A2-1/1 A3-1/1 |
| CAT3 | | | | | | | | A1-1/1 A2-1/1 A3-1/1 |

This embodiment of the invention works in a substantially similar manner as the key term groupings described above, except that the key term groupings may also include a category key term. For example, the search query "CAT1 AND Beta" could include just the one grouping CAT1-Beta, or could be separated into three groupings: CAT1-CAT1, Beta-Beta, and CAT1-Beta.

In yet another embodiment of the invention, the category key terms can be incorporated into one side of the index of key terms and associated with the key terms in the index to form the key term groupings. In this embodiment, the category key terms each function as just another key term to form the key term groupings and are included in the association of the comparison score and, if used, the key term probability scores. The category key terms can have a similar weight as other key terms or may be increasingly or decreasingly weighted to represent relative importance of the categories to the search query. An example of such an index wherein all articles are initially equally ranked in all categories is shown below.

| | Index | | | | |
|---|---|---|---|---|---|
| | Alpha | Beta | Gamma | Delta | Epsilon |
| CAT1 | A1-1/1 A2-1/1 A3-1/1 | A1-1/1 | A1-1/1 A3-1/1 | A2-1/1 A3-1/1 | A1-1/1 A3-1/1 |
| CAT2 | A1-1/1 A2-1/1 A3-1/1 | A1-1/1 | A1-1/1 A3-1/1 | A2-1/1 A3-1/1 | A1-1/1 A3-1/1 |
| CAT3 | A1-1/1 A2-1/1 A3-1/1 | A1-1/1 | A1-1/1 A3-1/1 | A2-1/1 A3-1/1 | A1-1/1 A3-1/1 |

This variation also works in a substantially similar manner as the key term groupings described above, with the key term groupings each including a category key term associated with a key term. For example, a key term grouping for the search query "CAT1 AND Beta" would have just the one grouping CAT1-Beta, and the key term grouping for the search query "CAT1 AND Alpha AND Beta" would have the two key term groupings CAT1-Alpha and CAT1-Beta.

RATINGS

The invention can also be used to organize articles by ratings. To this end, the key terms of the index may additionally or alternatively comprise rating key terms represented by the generic labels G-Rated and X-Rated, for example. The rating key term G-Rated is considered appropriate for all ages, while the rating key term X-Rated is considered appropriate only for adults.

The articles are each initially associated with one or more of these rating key terms by any possible manner such as by human judgment or default association. The key term score is associated with each article for each of the rating key terms. Additionally, the index may also include the key term total score for each rating key term score of each article, as described above for the key terms.

Moreover, the rating key terms can be incorporated into the index of key terms and included in the association of the comparison score and, if used, the key term probability score. The rating key terms can have a similar weight as other key terms or may be increasingly or decreasingly weighted.

For example, an initial index setting may look like this:

| Index | |
|---|---|
| G-Rated | X-Rated |
| A1 - 1/1 | A1 - 1/1 |
| A3 - 1/1 | A2 - 1/1 |
| | A3 - 1/1 |

The invention, operating separately from or in addition to the manner described above, would permit or require the user to enter a rating key term in the search query. The invention would operate in a similar manner for the rating key terms as described above for the key terms alone, whereby the search activity of the user would alter the key term scores and key term total scores for the rating key terms.

For example, if the user selected only article A3 after executing a search query containing the rating key term X-Rated, the key term score for article A3 under the rating key term X-Rated would be altered relative to the other rating key term scores. The key term total score for matched articles A1, A2 and A3 would also be altered. If the positive score is added to the key term scores for the selected matched article A3, and the positive score is added to the key term total score for the matched articles A1, A2 and A3, the index would then look like this:

| Index | |
|---|---|
| G-Rated | X-Rated |
| A1 - 1/1 | A1 - 1/2 |
| A3 - 1/1 | A2 - 1/2 |
| | A3 - 2/2 |

In this manner, people looking for X-Rated material will identify and effectively label that material as X-Rated. Such X-Rated material can then be screened entirely from the rating key term of G-Rated by precluding articles entirely from the search results which have a key term probability score or comparison score for the rating key term X-Rated above a predetermined threshold.

For example, suppose article A3 contained adult content and articles A1 and A2 contained non-adult content which would not be of interest to users searching with the rating key term of X-Rated. After several users have performed searches, the index may look like this:

| Index | |
|---|---|
| G-Rated | X-Rated |
| A1 - 4/4 | A1 - 2/7 |
| A3 - 21/22 | A2 - 2/10 |
| | A3 - 45/45 |

While the article A3 containing adult content was clearly of interest to the G-Rated crowd, it was also clearly of interest to the X-Rated crowd. Accordingly, the invention would screen the article A3 (i.e. prevent the squib from being displayed) from search queries containing the rating key term of G-Rated.

On the other hand, the rating key terms for articles A1 and A2 under the X-Rated key term are low and suggest that these articles A1 and A2 do not contain adult content. Accordingly, these articles could be displayed in response to a search query containing a rating key term of G-Rated.

The rating key term scores could be permanently or temporarily attached to each article (such as incorporated into a meta-tag) so that articles which are downloaded by persons authorized to access X-rated articles cannot be e-mailed to persons not authorized to receive such articles. In other words, the e-mail browser could have software incorporated therein which checks the rating key term score of any attached articles and screens out those articles which have an X-Rated key term score above the predetermined threshold.

IMPLEMENTATION

The present invention is intended to operate in any form of networked or stand alone computer or computer system. For instance, the program can be run on a server connected to the Internet. A user having a remote computer connected to the Internet can access the program over the Internet via a browser or other program and enter a search query from the remote site. The program on the server can generate a list of matched articles, by any method such as described herein, and transmit a list of squibs, such as hypertext links or other article identifiers to the remote computer for display on the screen. The user can then select one of the articles by "clicking" on the squib or other identifier, for example. By clicking is generally meant any electronic selection of the article and is specifically meant the positioning an electronic pointer on the squib of the article displayed on the screen via a mouse or other pointing device and operating the button or switch of the mouse one or more times to direct a browser to access the article or any other portion thereof.

If the squib is a hypertext link, then the browser of the remote computer will retrieve the data of the article from the server URL indicated by the hypertext link. Before or after accessing the article URL through the hypertext link, the remote computer can send a data packet to the search server to indicate which matched article the user selected. As a user selects an article, the invention can send a message to the search server or other location to indicate the selected article either before or after the article is retrieved, opened, listened or otherwise viewed by the user for any amount of time, or after a pre-determined amount of time. For example, the remote computer could send a message to the search server after the remote user has selected a matched article and had the article open for more than a predetermined length of time. This would indicate that the article was what the user was searching for and indicate a stronger correlation between the search query and the selected matched article.

The invention may be incorporated into a client-side or server-side software interface which accepts or otherwise records a search query which is forwarded or input directly to another search engine available over the Internet. That search engine can then generate a list of matched articles which is then forwarded to the software interface wherein the organization method described herein is utilized to rank the articles. Alternatively, the invention can be simply incorporated into the search engine as a single server-side or client-side software program.

In this connection, the invention may initially or continuously utilize the ranking of the articles provide by a search engine. Specifically, the index of the invention may be initially empty or set to a neutral setting and subsequently populated through repeated uses of the invention, whereby the invention "learns" from each user. Each subsequent user would thus benefit from the prior human judgements about which key terms or groupings are relevant to which articles. In this case, the organization or ranking provided by the search engine could initially be used in displaying the articles. Then, after a predetermined event or amount of time occurs, only the index of the invention could be used to organize the articles, if desired.

Alternatively, the comparison scores could be continuously combined with the ranking provided by the search engine to supplement or correct such a ranking. For example, the search engine may rank or organize the articles by providing a relevancy score, such as the percentile relevancy provided by the search engines "Excite" (TM) or "Lycos" (TM). This percentile could be associated (such as by averaging or multiplying) with the comparison score generated by the invention to create another comparison score that is then used to rank or organize the articles. For search engines that do not provide a percentile relevancy score, a percentile relevancy can be assigned to the articles in accordance with their order or position in the list generated by the search engine.

The index of the present invention may comprise a database, spreadsheet or any other means of storing (temporarily or otherwise) the scores or other information about the key terms and articles. The present invention may also be incorporated in a search engine, browser, or other data managing program. The scores or other information may also be integrated or otherwise associated with any index of key terms used by any search engine, browser, or other data managing program.

The index may include key terms, category key terms and ratings key terms. A search query may comprise one or more key terms coupled with a category key term and/or a rating key term. For example, a user could first select one or more category key terms. The category key terms can be selected through a hierarchical structure of key terms, i.e. Real Estate; Rental; Apartments; Los Angeles. The user can then enter or add onto the category key term a search query of one or more key terms such as words. The total search query could then include the category key terms and the words as key terms. If desired, a rating key term could also be added to the search query. This search query would then be processed as described above.

To further broaden the utility of the invention, a search query could be separated not only into its component key terms, but also into key terms or key term groupings that include synonyms or otherwise analogous or equivalent key terms. For example, the search query "Car and Chevrolet" could include the following key terms: Car, Automobile, Vehicle, Chevrolet, Chevy. If separated into key term groupings, there could be the key term groupings, Car-Chevrolet, Car-Chevy, Automobile-Chevrolet, Automobile-Chevy, Vehicle-Chevrolet and Vehicle-Chevy. These key terms or key term groupings could then all be altered as described above as the user selects and ignores certain of the matched articles. This use of similar key terms would broadened the use of the invention because a subsequent user who types in the search query "Automobile and Chevy" would benefit from the search activity of a previous user who typed in the search query "Car and Chevrolet" and selected certain articles from a list of hits.

Initially, the key terms, category key terms and rating key terms may be associated with words or other information in the article, or may be arbitrarily associated with the article in any manner. For example, the associations may be created by an indexing software robot which indexes all words in the article as key terms, meta tags specified by the author, reviewer or editor, or by any other means known or later developed for associating certain key terms with each article.

Although the scores in the index are initially shown at 1, they can be initially set to any desired score. For example, the scores can be initially set to correspond with the frequency of the term occurrence in the article. Alternatively, a human editor could assign scores according to judgments made by such editor.

The key term probability score can be created by any possible association between one or more of the key term scores and one or more of the key term total scores for the matched article under one or more of the matched key terms. Similarly, the comparison score can be created by any possible association between one or more of the key term scores and/or one or more of the key term total scores and/or one or more of the key term probability scores for the matched article under one or more of the matched key terms.

The squib may comprise any portion or representation of the matched article, such as the title, headings, first few lines of text, audio, video or any other type of information.

When a search identifies more matched articles than can be displayed on the user's computer screen, the altering of the index may affect only those articles which the user has had a chance to view the squib of and either select or not select. For example, suppose over 1000 matched articles are identified, and the user views only the squibs of the first 20 articles and selects one of these articles. The matched articles having squibs displayed on screen are called displayed matched articles. The index can be altered so as to alter the key term total scores of only the displayed matched articles under the matched key terms. In this manner, the scores of matched articles which are not seen by the user are not altered relative to other scores.

Although the index has been shown as listing the key terms and positioning the articles "under" the key terms, the index may be configured in any desired manner which allows the articles and scores to be associated with the key terms in any manner. For example, the index may be configured such that the key terms are positioned "under" the articles. An example of such an index is shown below.

| Index | | | | |
|---|---|---|---|---|
| A1 | A2 | A3 | A4 | A5 |
| Alpha-1/1 | Alpha-1/1 | Alpha-1/1 | Beta-1/1 | Alpha-1/1 |
| Beta-1/1 | | Gamma-1/1 | Gamma-1/1 | Gamma-1/1 |
| Gamma-1/1 | | | | |

Although the specification describes altering the index by adding the positive score, other permutations are possible. For example, if the user does not select the matched article, the key term score for that matched article under that key term can be assigned a negative score. The negative score can be (−1), for example. The negative score implies that the user believes that the article should not be associated with that key term. This is because the user has performed a search with a search query containing that matched key term and has not selected that matched article from that search. Further, if the article is not displayed on the screen because the user does not scroll down to display that article, the key term score for that matched article under that matched key term can be assigned a neutral score. The neutral score can be (0), for example. The neutral score implies that the user neither believes nor disbelieves that the article should be associated with that matched key term.

Another method of altering the index may comprise altering the key term scores and/or key term total scores by a first positive score for certain actions, such as simply opening the article for viewing or listening, and altering the key term scores and/or key term total scores by a second positive score for certain actions such as downloading, reading the entire article or reading the article for a predetermined length of time (i.e. determined as having the article open for a predetermined length of time while scrolling through the article on the screen). Preferably, the second positive score is greater than the first positive score such that certain actions by the user which are more likely to indicate the relevance of the article to the key words of the search query affect the index greater than certain actions which may be considered "noise" in the searcher's activity, i.e. such as what occurs when a user begins "surfing the net" aimlessly during a search query.

The definitions used herein are not meant to be limiting. For example, by altering is meant any action which changes the score or scores of the selected matched article relative to the scores of the unselected matched articles. By score is meant marking, indicia, indicator, data element, or other identifier, whether in computer code, a readable language, encryption, or any other method of data, all of which are collectively referred to as score. The names positive, negative and neutral as used in the scores do not necessarily refer to positive or negative numbers, but instead refer to whether an article has received a positive vote, a negative vote, or a neutral vote.

In yet another alternative embodiment, the search activity of a user can be stored in the form of what are commonly known in the computer industry as "cookies." For example, the key terms and/or key term groupings and scores for certain articles as a result of the search activity of the user could be stored as one or more cookies. These cookies could then be periodically downloaded to a central location for inclusion in the index, whereby the data from the cookies would be used to alter the index as described herein.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in form, function and manner of operation, implementation and use, are deemed readily apparent and obvious to one skilled in the art, and all equivalent relationships to those described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A method of organizing a plurality of articles comprising:

(a) providing an index, the index being able to store key terms and associate each article with at least one of the key terms, the index further being able to associate a key term score with each article under each of the respective key terms when stored within the index, wherein the index is able to further associate a key term total score with each key term score;

(b) accepting a first search query from a first user;

(c) identifying the key terms that match the first search query, the key terms that match the first search query being first matched key terms;

(d) displaying squibs of articles related to the first search query to the first user;

(e) allowing the first user to select at least one of the articles related to the first search query, the article selected by the first user being a selected article;

(f1a) altering the index such that the key term score for the selected article under at least one of the first matched key terms is altered relative to other key term scores;

(f1b) altering the index such that key term total scores of at least one of the articles related to the first search query under at least one of the first matched key terms are altered relative to other key term total scores;

(g) accepting a second search query from a second user;

(h) identifying key terms that match the second search query, the key terms that match the second search query being second matched key terms;

(i) displaying squibs of articles related to the second search query to the second user, wherein the squibs of articles related to the second search query are organized in order of superiority of their key term scores under at least one of the second matched key terms when at least one of the second matched key terms matches at least one of the first matched key terms, whereby the selected article will be ranked higher for the second user than before the first user had selected the article.

2. The method of organizing a plurality of articles of claim 1 wherein step (f1a) comprises:

(f2a) altering the index such that the key term score for the selected article under at least one of the first matched key terms is altered relative to other key term scores; and further wherein step (f1b) comprises:

(f2b) altering the index such that key term total scores of at least one of the articles related to the first search query under at least one of the first matched key terms are altered relative to other key term total scores, but only for articles that have had their squibs displayed to the first user.

3. The method of organizing a plurality of articles of claim 1, wherein step (f1a) comprises:
(f3a) adding a positive score to the key term scores for the selected article under at least one of the first matched key terms.

4. The method of organizing a plurality of articles of claim 1, wherein step (f1a) comprises:
(f4a) adding a positive score to the key term scores for the selected article under all the first matched key terms.

5. The method of organizing a plurality of articles of claim 1, wherein step (i) comprises:
(i5a) associating the key term score of individual articles related to the second search query under at least one of the second matched key terms with the respective key term total score to create a key term probability score for each of the respective individual articles related to the second search query under the respective second matched key term;
(i5b) associating the key term probability scores of individual articles related to the second search query under at least some of the second matched key terms to create comparison scores for each of the respective individual articles related to the second search query;
(i5c) displaying squibs of articles related to the second search query in order of superiority of the comparison scores when at least a portion of the second search query is related to the at least a portion of the first search query.

6. The method of organizing a plurality of articles of claim 5, wherein step (i5b) comprises:
(i6b) at least multiplying the key term probability scores of individual articles related to the second search query under at least some of the second matched key terms to create comparison scores for each of the respective individual articles related to the second search query.

7. The method of organizing a plurality of articles of claim 5, wherein step (i5b) comprises:
(i7b) at least adding the key term probability scores of individual articles related to the second search query under at least some of the second matched key terms to create comparison scores for each of the respective individual articles related to the second search query.

8. The method of organizing a plurality of articles of claim 5, wherein step (i5b) comprises:
(i8b) at least averaging the key term probability scores of individual articles related to the second search query under at least some of the second matched key terms to create comparison scores for each of the respective individual articles related to the second search query.

9. The method of organizing a plurality of articles of claim 1, wherein step (i5a) comprises:
(i6a) at least dividing the key term score of individual articles related to the second search query under at least one of the second matched key terms by the respective key term total score to create a key term probability score for each of the respective individual articles related to the second search query under the respective second matched key term.

10. The method of organizing a plurality of articles of claim 9, wherein step (i5b) comprises:

(i6b) at least multiplying the key term probability scores of individual articles related to the second search query under at least some of the second matched key terms to create comparison scores for each of the respective individual articles related to the second search query.

11. The method of organizing a plurality of articles of claim 9, wherein step (i5b) comprises:
(i7b) at least adding the key term probability scores of individual articles related to the second search query under at least some of the second matched key terms to create comparison scores for each of the respective individual articles related to the second search query.

12. The method of organizing a plurality of articles of claim 9, wherein step (i5b) comprises:
(i6b) at least averaging the key term probability scores of individual articles related to the second search query under at least some of the second matched key terms to create comparison scores for each of the respective individual articles related to the second search query.

13. A method of organizing a plurality of articles comprising:
(a) providing an index, the index being able to store key terms and associate each article with at least one of the key terms, the index further being able to associate a key term score with each article under each of the respective key terms when stored within the index;
(b) accepting a first search query from a first user;
(c) identifying the key terms that match the first search query, the key terms that match the first search query being first matched key terms:
(d) displaying squibs of articles related to the first search query to the first user;
(e1) allowing the first user to select at least one of the articles related to the first search query through any action allowing the first user to sense more than just the squib of the at least one of the articles related to the first search query, the article selected by the first user being a selected article;
(f) altering the index such that the key term score for the selected article under at least one of the first matched key terms is altered relative to other key term scores;
(g) accepting a second search query from a second user;
(h) identifying key terms that match the second search query, the key terms that match the second search query being second matched key terms;
(i) displaying squibs of articles related to the second search query to the second user, wherein the squibs of articles related to the second search query are organized in order of superiority of their key term scores under at least one of the second matched key terms when at least one of the second matched key terms matches at least one of the first matched key terms, whereby the selected article will be ranked higher for the second user than before the first user had selected the article.

14. The method of organizing a plurality of articles of claim 13, wherein step (g) comprises:
(g1) accepting a second search query from a second user, the second user being different from the first user.

15. The method of organizing a plurality of articles of claim 13, and further comprising:
(j) allowing the second user to select at least one of the articles related to the second search query, the article selected by the second user being a second selected article;
(k) altering the index such that the key term score for the second selected article under at least one of the second matched key terms is altered relative to other key term scores;

(l) repeating steps (g) through (k) for additional users.

16. The method of organizing a plurality of articles of claim 13, wherein step (i) comprises:
(i1a) associating the key term scores of individual articles related to the second search query under at least some of the second matched key terms to create comparison scores for each of the respective individual articles related to the second search query;
(i2b) displaying squibs of articles related to the second search query in order of superiority of the comparison scores when at least a portion of the second search query is related to the at least a portion of the first search query.

17. The method of organizing a plurality of articles of claim 16, wherein step (i1a) comprises:
(i2a) at least multiplying the key term scores of individual articles related to the second search query under at least some of the second matched key terms to create comparison scores for each of the respective individual articles related to the second search query.

18. The method of organizing a plurality of articles of claim 16, wherein step (i1a) comprises:
(i3a) at least adding the key term probability scores of individual articles related to the second search query under at least some of the second matched key terms to create comparison scores for each of the respective individual articles related to the second search query.

19. The method of organizing a plurality of articles of claim 16, wherein step (i1a) comprises:
(i4a) at least averaging the key term probability scores of individual articles related to the second search query under at least some of the second matched key terms to create comparison scores for each of the respective individual articles related to the second search query.

20. A method of organizing a plurality of articles comprising:
(a) providing an index, the index being able to store key terms and associate each article with at least one of the key terms, the index further being able to associate a key term score with each article under each of the respective key terms when stored within the index;
(b) accepting a first search query from a first user;
(c) identifying the key terms that match the first search query, the key terms that match the first search query being first matched key terms;
(d) displaying squibs of articles related to the first search query to the first user;
(e2) allowing the user to select at least one of the articles related to the first search query by clicking on a hypertext link portion of the squib of the at least one of the articles related to the first search query, the article selected by the user being a selected article;
(f) altering the index such that the key term score for the selected article under at least one of the first matched key terms is altered relative to other key term scores;
(g) accepting a second search query from a second user;
(h) identifying key terms that match the second search query, the key terms that match the second search query being second matched key terms;
(i) displaying squibs of articles related to the second search query to the second user, wherein the squibs of articles related to the second search query are organized in order of superiority of their key term scores under at least one of the second matched key terms when at least one of the second matched key terms matches at least one of the first matched key terms, whereby the selected article will be ranked higher for the second user than before the first user had selected the article.

21. The method of organizing a plurality of articles of claim 20, wherein step (g) comprises:
(g1) accepting a second search query from a second user, the second user being different from the first user.

22. The method of organizing a plurality of articles of claim 20, and further comprising:
(j) allowing the second user to select at least one of the articles related to the second search query, the article selected by the second user being a second selected article;
(k) altering the index such that the key term score for the second selected article under at least one of the second matched key terms is altered relative to other key term scores;
(l) repeating steps (g) through (k) for additional users.

23. The method of organizing a plurality of articles of claim 20, wherein step (i) comprises:
(i1a) associating the key term scores of individual articles related to the second search query under at least some of the second matched key terms to create comparison scores for each of the respective individual articles related to the second search query;
(i2b) displaying squibs of articles related to the second search query in order of superiority of the comparison scores when at least a portion of the second search query is related to the at least a portion of the first search query.

24. The method of organizing a plurality of articles of claim 23, wherein step (i1a) comprises:
(i2a) at least multiplying the key term scores of individual articles related to the second search query under at least some of the second matched key terms to create comparison scores for each of the respective individual articles related to the second search query.

25. The method of organizing a plurality of articles of claim 23, wherein step (i1a) comprises:
(i3a) at least adding the key term probability scores of individual articles related to the second search query under at least some of the second matched key terms to create comparison scores for each of the respective individual articles related to the second search query.

26. The method of organizing a plurality of articles of claim 23, wherein step (i1a) comprises:
(i4a) at least averaging the key term probability scores of individual articles related to the second search query under at least some of the second matched key terms to create comparison scores for each of the respective individual articles related to the second search query.

27. A method of organizing a plurality of articles comprising:
(a) providing an index, the index being able to store key terms and associate each article with at least one of the key terms, the index further being able to associate a key term score with each article under each of the respective key terms when stored within the index;
(b) accepting a first search query from a first user;
(c) identifying the key terms that match the first search query, the key terms that match the first search query being first matched key terms;
(d) displaying squibs of articles related to the first search query to the first user;
(e3) allowing the user to select at least one of the articles related to the first search query by opening the at least one of the articles related to the first search query, the article selected by the first user being a selected article;

(f) altering the index such that the key term score for the selected article under at least one of the first matched key terms is altered relative to other key term scores;

(g) accepting a second search query from a second user;

(h) identifying key terms that match the second search query, the key terms that match the second search query being second matched key terms;

(i) displaying squibs of articles related to the second search query to the second user, wherein the squibs of articles related to the second search query are organized in order of superiority of their key term scores under at least one of the second matched key terms when at least one of the second matched key terms matches at least one of the first matched key terms, whereby the selected article will be ranked higher for the second user than before the first user had selected the article.

28. The method of organizing a plurality of articles of claim 27, wherein step (g) comprises:

(g1) accepting a second search query from a second user, the second user being different from the first user.

29. The method of organizing a plurality of articles of claim 27, and further comprising:

(j) allowing the second user to select at least one of the articles related to the second search query, the article selected by the second user being a second selected article;

(k) altering the index such that the key term score for the second selected article under at least one of the second matched key terms is altered relative to other key term scores;

(l) repeating steps (g) through (k) for additional users.

30. The method of organizing a plurality of articles of claim 27, wherein step (i) comprises:

(i1a) associating the key term scores of individual articles related to the second search query under at least some of the second matched key terms to create comparison scores for each of the respective individual articles related to the second search query;

(i2b) displaying squibs of articles related to the second search query in order of superiority of the comparison scores when at least a portion of the second search query is related to the at least a portion of the first search query.

31. The method of organizing a plurality of articles of claim 30, wherein step (i1a) comprises:

(i2a) at least multiplying the key term scores of individual articles related to the second search query under at least some of the second matched key terms to create comparison scores for each of the respective individual articles related to the second search query.

32. The method of organizing a plurality of articles of claim 30, wherein step (i1a) comprises:

(i3a) at least adding the key term probability scores of individual articles related to the second search query under at least some of the second matched key terms to create comparison scores for each of the respective individual articles related to the second search query.

33. The method of organizing a plurality of articles of claim 30, wherein step (i1a) comprises:

(i4a) at least averaging the key term probability scores of individual articles related to the second search query under at least some of the second matched key terms to create comparison scores for each of the respective individual articles related to the second search query.

34. A method of organizing a plurality of articles comprising:

(a) providing an index, the index being able to store key terms and associate each article with at least one of the key terms, the index further being able to associate a key term score with each article under each of the respective key terms when stored within the index;

(b) accepting a first search query from a first user;

(c) identifying the key terms that match the first search query, the key terms that match the first search query being first matched key terms;

(d) displaying squibs of articles related to the first search query to the first user;

(e4) allowing the user to select at least one of the articles by retrieving the at least one of the articles related to the first search query from a remote server, the article selected by the first user being a selected article;

(f) altering the index such that the key term score for the selected article under at least one of the first matched key terms is altered relative to other key term scores;

(g) accepting a second search query from a second user;

(h) identifying key terms that match the second search query, the key terms that match the second search query being second matched key terms;

(i) displaying squibs of articles related to the second search query to the second user, wherein the squibs of articles related to the second search query are organized in order of superiority of their key term scores under at least one of the second matched key terms when at least one of the second matched key terms matches at least one of the first matched key terms, whereby the selected article will be ranked higher for the second user than before the first user had selected the article.

35. The method of organizing a plurality of articles of claim 34, wherein step (i) comprises:

(i1a) associating the key term scores of individual articles related to the second search query under at least some of the second matched key terms to create comparison scores for each of the respective individual articles related to the second search query;

(i2b) displaying squibs of articles related to the second search query in order of superiority of the comparison scores when at least a portion of the second search query is related to the at least a portion of the first search query.

36. The method of organizing a plurality of articles of claim 35, wherein step (i1a) comprises:

(i2a) at least multiplying the key term scores of individual articles related to the second search query under at least some of the second matched key terms to create comparison scores for each of the respective individual articles related to the second search query.

37. The method of organizing a plurality of articles of claim 35, wherein step (i1a) comprises:

(i3a) at least adding the key term probability scores of individual articles related to the second search query under at least some of the second matched key terms to create comparison scores for each of the respective individual articles related to the second search query.

38. The method of organizing a plurality of articles of claim 35, wherein step (i1a) comprises:

(i4a) at least averaging the key term probability scores of individual articles related to the second search query under at least some of the second matched key terms to create comparison scores for each of the respective individual articles related to the second search query.

39. A method of organizing a plurality of articles comprising:
- (a) providing an index, the index being able to store category terms and associate each article with at least one of the category terms, the index further being able to associate a category term score with each article under each of the respective category terms when stored within the index;
- (b) accepting a first search query from a first user;
- (c) accepting at least one first category term from the first user, the first category term being an indication of a generic type of information the first user is searching for;
- (d) identifying articles related to the first search query;
- (e) displaying squibs of articles related to the first search query to the first user;
- (f) allowing the first user to select at least one of the articles related to the first search query, the article selected by the first user being a first selected article;
- (g) altering the index such that the selected article is associated with the first category term and the category term score for the selected article under at least the first category term is altered relative to other category term scores;
- (h) accepting at least one second category term from the second user, the second category term being an indication of a generic type of information the second user is searching for;
- (i) displaying squibs of articles associated with the second category term to the second user, wherein the squibs of articles associated with the second category term are organized relative to their key term scores under the at least one second category term when the second category term is related to the first category term, whereby the first selected article will be ranked higher than before the first user had selected the article.

40. A method of organizing a plurality of articles comprising:
- (a) providing an index, the index being able to store key terms and associate each article with at least one of the key terms, the index further being able to associate a key term score with each article under each of the respective key terms when stored within the index, the index further being able to store category terms and associate each article with at least one of the category terms, the index further being able to associate a category term score with each article under each of the respective category terms when stored within the index;
- (b) accepting a first search query from a first user;
- (c) accepting at least one first category term from the first user, the first category term being an indication of a generic type of information the first user is searching for;
- (d) identifying articles related to the first search query;
- (e) displaying squibs of articles related to the first search query to the first user;
- (f) allowing the first user to select at least one of the articles related to the first search query, the article selected by the first user being a first selected article;
- (g) identifying the key terms that match the first search query, the key terms that match the first search query being first matched key terms;
- (h) altering the index such that the key term score for the selected article under at least one of the first matched key terms is altered relative to other key term scores;
- (i) altering the index such that the selected article is associated with the first category term and the category term score for the selected article under at least the first category term is altered relative to other category term scores;
- (j) accepting a second search query from a second user;
- (k) accepting at least one second category term from the second user, the second category term being an indication of a generic type of information the second user is searching for;
- (m) displaying squibs of articles associated with the second search query and the second category term to the second user, wherein the squibs of articles associated with the second category term are organized relative to their key term scores under the at least one second category term when the second category term is related to the first category term, whereby the first selected article will be ranked higher than before the first user had selected the article.

41. A method of organizing a plurality of articles comprising:
- (a) providing an index, the index being able to store rating terms and associate each article with at least one of the rating terms, the index further being able to associate a rating term score with each article under each of the respective rating terms when stored within the index;
- (b) accepting a first search query from a first user;
- (c) accepting a first rating term from the first user, the first rating term being an indication of an appropriateness of an article for particular age groups, including all-age groups and adults-only groups;
- (d) displaying squibs of articles related to the first search query to the first user;
- (e) allowing the first user to select at least one of the articles related to the first search query, the article selected by the first user being a selected article;
- (f) altering the index such that the rating term score for the selected article under at least one of the first rating terms is altered relative to other key term scores;
- (g) accepting a second search query from a second user;
- (h) accepting a second rating term from the second user, the second rating term being an indication of an appropriateness of an article for particular age groups, including all-age groups and adults-only groups;
- (i) displaying squibs of articles related to the second search query to the second user in which the rating term score of the respective article under the first rating term is below a predetermined threshold when the second rating term is different than the first rating term;
- (j) displaying squibs of articles related to the second search query to the second user when the second rating term is the same as the first rating term.

42. A method of organizing a plurality of articles comprising:
- (a) providing an index, the index being able to store key term groupings derived from search queries entered by previous users, and associate each article with at least one of the key term groupings, the index further being able to associate a key term score with each article under each of the respective key term groupings when stored within the index;
- (b) accepting a first search query from a first user;
- (c) deriving key term groupings from the first search query, the key term groupings derived from the first search query being first matched key term groupings;

(d) displaying squibs of articles related to the first search query to the first user;

(e) allowing the first user to select at least one of the articles related to the first search query, the article selected by the first user being a selected article;

(f) altering the index such that the key term score for the selected article under at least one of the first matched key term groupings is altered relative to other key term scores;

(g) accepting a second search query from a second user;

(h) identifying the key term groupings that match the second search query, the key term groupings that match the second search query being second matched key term groupings;

(i) displaying squibs of articles related to the second search query to the second user, wherein the squibs of articles related to the second search query are organized relative to their key term scores under at least one of the second matched key term groupings when at least one of the key term groupings from the second search query matches at least one of the first key term groupings from the first search query, whereby the selected article will be ranked higher than before the first user had selected the article.

43. The method of organizing a plurality of articles of claim 42, wherein step (g) comprises:

(g1) accepting a second search query from a second user, the second user being different from the first user.

44. The method of organizing a plurality of articles of claim 42, wherein step (c) comprises:

(c1) deriving key term groupings which each contain at least one term derived from the first search query, the key term groupings derived from the first search query being first matched key term groupings.

45. The method of organizing a plurality of articles of claim 42, wherein step (c) comprises:

(c2) deriving key term groupings containing at least two different terms derived from the first search query, the key term groupings derived from the first search query being first matched key term groupings.

46. The method of organizing a plurality of articles of claim 42, wherein step (c) comprises:

(c3) deriving a key term grouping containing all the terms in the first search query in any order, the key term grouping derived from the first search query being a first matched key term grouping.

* * * * *